United States Patent Office 3,022,104
Patented Feb. 20, 1962

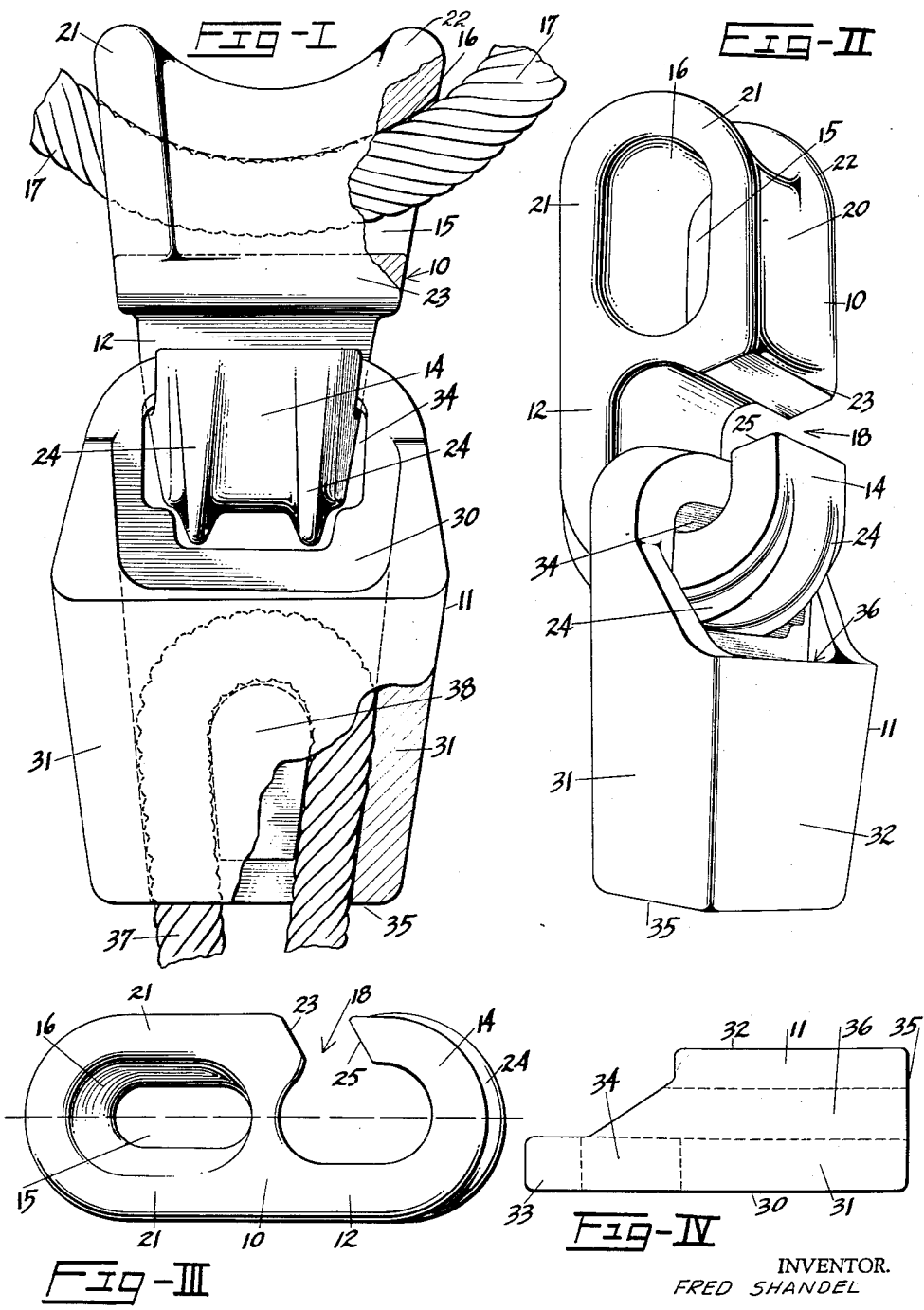

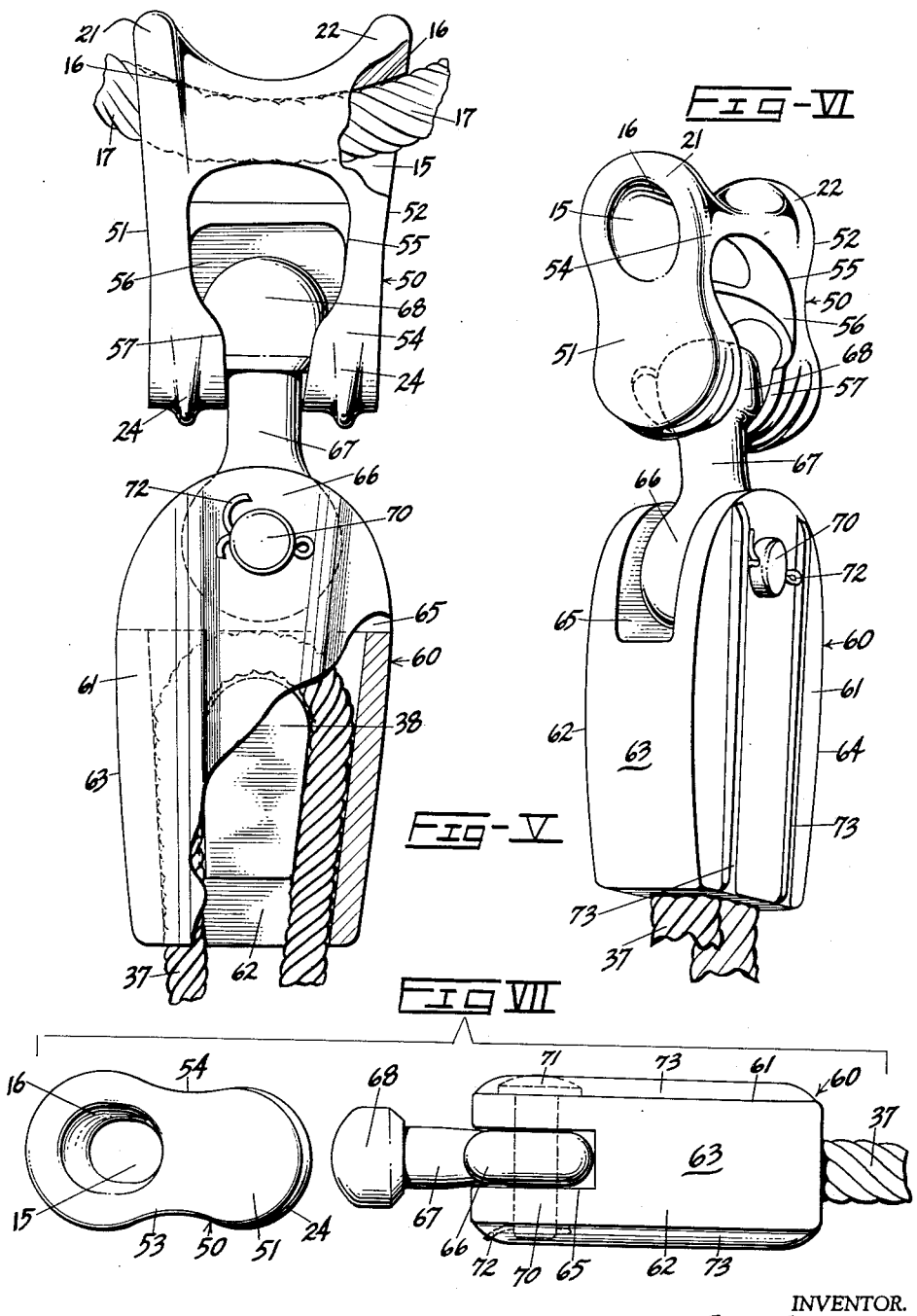

3,022,104
HOOK AND EYE CHOKER ASSEMBLY
Fred Shandel, Box 66, Albion, Calif.
Filed Mar. 31, 1958, Ser. No. 725,393
8 Claims. (Cl. 294—74)

This invention relates to logging rigging equipment, and particularly to quick-coupling fittings for chokers.

In modern logging practice a choker, which is a length of wire rope or cable which is placed around the log adjacent one end, is used to haul each log from the place of cutting to a central loading place for further transport to the mill. Thus, chokers are constantly in use in the woods and are subjected to the roughest kind of conditions and treatment. Formerly, the ends of the chokers were made with eye splices, but these have been replaced for the most part by faster and safer coupling means. At the present time chokers are usually provided with ferrules at both ends, but usually with an eye socket at one end and a ferrule at the other.

Ferrules are a cylindrical steel member, usually about twice the diameter of the cable to which they are attached, and are intended to form a pulling end to the choker. There are some eight or nine steps required to secure a ferrule properly to the end of a choker and these include serving the choker cable inwardly of the intended position of the ferrule, fraying the cable end, cleaning the cable end, driving the ferrule over the separated strands into proper position, distributing the strands evenly within the tapered recess of the ferrule so that the ends are flush with the top of the ferrule, providing a mud seal at the bottom of the ferrule on the outside, fluxing the distributed strand ends in the recess and pouring hot molten socket metal into the ferrule recess and strands. Obviously, this is a time-consuming operation and one which makes it necessary to have both special tools and skills. There are also the attendant dangers in using the molten metal, from splattering and explosions. It is quite apparent that when ferrules pull off of or when the choker breaks, it is not really practical to replace ferrules on the choker end in the woods. At the present time loggers take a number of chokers into the woods because it is unsatisfactory to make repairs in the woods. However, since ferrules are only about fifty percent satisfactorily secured, unless put on by a skilled worker under optimum conditions, it is not infrequent that a logger in a remote location may find that he has damaged all of his chokers and he has no alternative except to return to his base for repairs. Although ferrules have up to the present time represented the best and safest means of coupling and are far superior to spliced eyes, nevertheless it costs relatively too much to put ferrules on the choker lines even under the best of circumstances.

With the advent of ferrules, a closed hook was devised which is known in the art as a Bardon hook. This hook is a special casting having a transverse passage for the choker and an enlarged opening on one side face thereof with a cut or pass over the outer end to provide a groove of lesser width, which opening and groove lead into an interior chamber. Obviously, all that is required to secure the choker end with a ferrule in this closed hook, is to pass the ferrule through the enlarged side opening with the choker cable entering the groove at the end. A pull on the choker immediately seats the ferrule within the chamber from which it cannot be removed except by intentional action. Because of the increased safety of Bardon hooks and choker ferrules over eye splicing and because of the ease and speed of making the coupling, the difficulties and problems arising from the use of ferrules and their limited effective attachment have been endured.

Accordingly, it is one of the objects of the present invention to provide the benefits of the so-called Bardon hook without the disadvantages and problems of ferrules.

A further object is to provide an eye member or portion which is adaptable for use in connection with Bardon closed hooks.

It is also an object of the present invention to provide a choker coupling which completely eliminates the necessity of ferrules.

It is another object of the present invention to provide a coupling method which does not require the use and pouring of hot metals in the woods or in any other location.

A still further object of the invention is to provide a quick and secure coupling means which can quickly and readily be attached to the choker end in the woods and without the necessity of special tools and equipment.

Further objects are to provide a construction of maximum simplicity, economy, and ease of manufacture, also such further objects, advantages and capabilities as will fully appear and as are inherently possessed by the device and the invention described herein.

The invention further resides in the combination, construction and arrangement of parts illustrated in the accompanying drawings, and while there is shown therein a preferred embodiment and one variation thereof, it is to be understood that the same are merely illustrative of the invention and that the invention is capable of modification and change and comprehends other details of construction without departing from the spirit thereof or the scope of the pending claims.

Referring to the drawings:

FIGURE 1 is a top plan view of an open hook and eye choker assembly in the operative or locked position, showing portions of the choker cable and with the eye member broken away to expose the interior chamber;

FIGURE 2 is a perspective view of the open hook and eye assembly, but without the choker cable;

FIGURE 3 is a side elevational view of the hook portion of the assembly;

FIGURE 4 is a side elevational view of the eye portion;

FIGURE 5 shows the preferred form of the closed hook and eye choker assembly in the locked or operative position in top plan view, with a portion of the eye member cut away and showing portions of the choker cable;

FIGURE 6 is a perspective view of the closed hook and eye assembly in the locked or operative position with only the lower portion of the choker cable being indicated; and FIGURE 7 shows both the closed hook and the eye portions of the coupling disengaged, in side elevation.

Referring now more particularly to the drawings in which like reference numerals indicate like parts in the several views, it is apparent that the coupling shown in FIGURES 1 to 4, inclusive, is composed of two portions, the hook portion generally designated 10 and the eye portion generally designated 11. Both portions are made of special manganese steel castings which work harden and which are strong enough to withstand the rigors and brute power of the logging operations. The hook portion 10 is an irregular shaped casting having a continuous under portion 12 which continuously extends and forms the upturned hook 14. At the opposite end from the hook the casting is formed with a transverse passage 15 which is shaped at the upper or outer face 16 thereof to conform substantially with the curvature of the cable or wire rope 17 which constitutes a portion of the choker. The transverse aperture 15 is, of course, completely surrounded by the metal of the casting while the hook 14 does not complete the circuit but leaves a transverse gap or opening 18 along the top face thereof. Preferably, the hook casting is reduced in thickness by hollowing the top and bottom surfaces as at 20 which leaves the side marginal edges 21 and 22 as well as the lateral lip 23 with the full reinforced thickness of metal. The hook end is also provided preferably with outwardly directed ribs 24, which not only add strength, but which also serve as skids to prevent abrasion and wear in use. It will be observed that the terminating lateral face 25 of the hook 14, as viewed in FIGURE 3, is sloped inwardly and that the face facing lip 23 at the opposite side of the opening 18 is sloped substantially parallel thereto. This, of course, is to aid in the locking of the eye portion and prevent inadvertent uncoupling.

The eye portion 11 is a casting of similar composition and is substantially a hollow wedge-shape box, having a back portion 30, identical side portions 31 and a top portion 32. The lower or back portion 30 has an elongated lip 33 which extends beyond the limits of the top member 32. In this lip portion there is a vertical opening 34 which is of sufficient size both in width and length to accommodate the hook 14 of the hook portion 10, including ribs 24, when in the horizontal locked position as shown in FIGURES 1 and 2. It is apparent that the thickness of the casting for the back portion 30 is calculated so that it will pass through the hook opening 18 with ease and without binding. As will be seen from FIGURE 1 the sides 31 of the casting are tapered so that they narrow in spacing toward the outward end 35. This provides a horizontal wedge-shape chamber or passage 36 longitudinally through the casting. In order to attach the end of the choker cable or wire rope 37, a wedge 38 is provided which has a thickness slightly less than the height of the passage 36 and a maximum width, which, together with two diameters of the cable 37, will pass only partly through the passage 36.

Looking at FIGURE 1, it will be seen that the choker end 37 can be quickly secured within the eye 11 by forming a loop in the cable and inserting the wedge 38 therebetween. When the choker cable end 37 is looped and the wedge block 38 is placed in position in the tapered passage 36, the choker end 37 is secured therein by hitting or driving the same downwardly into a position similar to that shown in FIGURE 1. Obviously, further pulling on the choker 37 will merely cause the same to wedge more tightly in the locked position.

It is apparent that using this form of eye and wedged cable holding permits re-establishing the choker holding in the field in a very few minutes without the necessity of any special tools. Also, the necessity for ferrules is completely eliminated.

Referring now to FIGURE 3, it may be observed that the hook is so cast that in a straight horizontal pull the force will be on the horizontal median line shown by the broken line A—A in the figure.

The preferred form of this invention is shown in FIGURES 5 to 7, inclusive, and is represented by what is known as a closed hook generally designated as 50. The closed hook is of substantially the same general irregular form of casting with continuous sides 51 and 52 with a solid bottom portion 53 and a top portion 54 which is cut out as will hereinafter be explained. It has the same transverse opening 15 curved as at 16 to the shape of the cable 17 with reinforcing ribs 21 and 22 running longitudinally at the marginal edges. Likewise, the outside curve at its outer end is provided with the reinforcing ribs 24 precisely as before described. As stated above, the upper face of the casting 54 is formed with an extended circular opening 55 into the hollow interior chamber 56, which opening narrows to a vertical or axially curved slot 57 which cuts down through the outer end wall between the reinforcing ribs 24. This slot terminates in a U before reaching the bottom section 53.

The eye portion 60 is a solid continuous casting having integral top and bottom portions 61 and 62, respectively, and side portions 63 and 64. The side portions extend only a portion of the length from the outer end, leaving a transverse slot 65 which separates and spaces the inner ends of the top and bottom portions 61 and 62. It is apparent from FIGURE 5 that the side portions 63 and 64 are angled toward each other to provide a tapered passage 65' which becomes narrower towards its outlet.

Pivotally mounted within the slot 65 is a closed eye bolt 66 having a radial shank 67 to the end of which is permanently secured a cylindrical, rounded knob 68. The knob 68 is obviously of a sufficient size so that it will pass downwardly through the opening 56 of the hook portion, but will be retained by the vertical or axially curved slot 57 thereof. On the other hand, the radial shank 67 is of a diameter which will ride easily in the axially curved slot 57. It is apparent that under load conditions the knob 68 will tend to swivel and thus prevent damaging choker kinks or twisting. The closed eye bolt 66 is mounted in the slot 65 for pivotal movement in the plane defined by the slot 65 by means of pivot pin 70 whose head 71 bears against the outside surface of the eye portion 60 at one side and whose opposite other end projects beyond the surface of the opposite side of the eye portion 60 and is held in this position by the cotter pin 72. It is to be observed from FIGURE 7 that the eye portion 60 is provided with longitudinal reinforcing ridges and skids 73 which are of sufficient altitude to protect the pivot pin head 71 and the opposite end with its cotter pin 72 from being damaged or disturbed under the difficult and rough conditions of logging.

Here again, if the choker cable 37 breaks, all that it is necessary to do to restore the choker to operative condition is to remove the cotter pin and pivot pin 72 and 70, respectively, loop the cable 37 in the manner described earlier and place the wedge 38 within the loop and drive the same down into the tapered passage. When the cable end is firmly secured in this manner, then the eye portion 60 can be again pivotally attached to the closed eye bolt 66 by means of the pivot pin 70 and the cotter pin 72. This can be accomplished, of course, without special tools, without molten metal, and can be done easily in the field, remote from the home base.

The eye portion 60 may be used with any Bardon type closed hook and when so used it is termed an adapter in the trade.

It is apparent from FIGURE 4 that the height of the chamber 36 is substantially the diameter of the cable or rope 37 used. Thus, if the free end of the rope or cable 37 is looped in the manner shown in FIGURE 1 and placed in the chamber 36, the same may be held against a pull thereon merely by wedging this eye, without the internal wedge 38 being used.

I claim:

1. A closed hook and eye choker assembly comprising in combination a closed hook member having an opening in the side thereof, said member also having an axial curved slot of narrower width extending from and connecting with said opening and cutting through a portion of the end thereof, an eye portion having a longitudinal passage therethrough and a transverse slot at one end, said passage becoming narrower toward the outlet end opposite to the slotted end, an eye having a radial shank mounted in said slot through said eye for pivotal movement in the slot of said eye portion, said shank having a cross section less than the width of said closed hook slot and adapted to be received therein, an integral head on said shank of larger diameter than said slot but smaller than said closed hook side opening and capable of passing therethrough and held therein, and a tapered wedge member for insertion in the loop of the choker end to wedge the loop within said longitudinal passage and hold the choker from pulling therethrough.

2. A closed hook and eye choker assembly comprising in combination a closed hook member having an opening in the side thereof, said member also having an axial curved slot of narrower width extending from and connecting with said opening and cutting through a portion of the end thereof, an eye portion having a longitudinal passage therethrough and a transverse slot at one end, said passage becoming narrower toward the outlet end opposite to the slotted end, an eye having a radial shank mounted in said slot through said eye for pivotal movement in the slot of said eye portion, said shank having a cross section less than the width of said closed hook slot and adapted to be received therein, an integral head on said shank of larger diameter than said slot but smaller than said closed hook side opening and capable of passing therethrough and held therein, a removable pivot pin passing transversely through said slot and through said eye to retain the same in position, and a tapered wedge member for insertion in the loop of the choker end to wedge the loop within said longitudinal passage and hold the choker from pulling therethrough.

3. A closed hook and eye choker assembly comprising in combination a closed hook member having an opening in the side thereof, said member also having an axial curved slot of narrower width extending from and connecting with said opening and cutting through a portion of the end thereof, a separate transverse curved cable passage through said closed hook, an eye portion having a longitudinal passage therethrough and a transverse slot at one end, said passage becoming narrower toward the outlet end opposite to the slotted end, an eye having a radial shank mounted in said slot through said eye for pivotal movement in the slot of said eye portion, said shank having a cross section less than the width of said closed hook slot and adapted to be received therein, an integral head on said shank of larger diameter than said slot but smaller than said closed hook side opening and capable of passing therethrough and held therein, a removable pivot pin passing transversely through said slot and through said eye to retain the same in position, integral ridges on the outer surfaces of said eye portion arranged longitudinally thereof at either side of said pivot pin ends, and a tapered wedge member for insertion in the loop of the choker end to wedge the loop within said longitudinal passage and hold the choker from pulling therethrough.

4. A closed hook adapter for cable ends comprising in combination an integral eye portion having a longitudinal passage therethrough and a transverse slot at one end, said passage becoming narrower toward the outlet end which is opposite to the slotted end, an eye mounted in said slot through said eye for pivotal movement, said eye having a radial shank extending outwardly from said slot, an integral head on said shank having a larger diameter than said shank, and a tapered wedge received within said longitudinal passage cooperating with the looped cable end and the walls of said passage to prevent the cable from pulling through.

5. A closed hook adapter for cable ends comprising in combination an integral eye portion having a longitudinal passage therethrough and a transverse slot at one end, said passage becoming narrower toward the outlet end which is opposite to the slotted end, an eye mounted in said slot through said eye for pivotal movement, said eye having a radial shank extending outwardly from said slot, an integral head on said shank having a larger diameter than said shank, a removable pivot pin passing transversely through said slot and through said eye, and a tapered wedge received within said longitudinal passage cooperating with the looped cable end and the walls of said passage to prevent the cable from pulling through.

6. A closed hook adapter for cable ends comprising in combination an integral eye portion having a longitudinal passage therethrough and a transverse slot at one end, said passage becoming narrower toward the outlet end which is opposite to the slotted end, an eye mounted in said slot through said eye for pivotal movement, said eye having a radial shank extending outwardly from said slot, an integral head on said shank having a larger diameter than said shank, a removable pivot pin passing transversely through said slot and through said eye, integral ridges on the outer surfaces of said eye portion arranged longitudinally thereof at either side of said pivot pin ends, and a tapered wedge received within said longitudinal passage cooperating with the looped cable end and the walls of said passage to prevent the cable from pulling through.

7. A coupling for a choker rope comprising in combination a choker rope, a free-running closed hook member having a transverse passage therethrough for said rope movably retaining said member thereon, said closed hook member having an opening in one side thereof connecting with an axially curved slot of narrower width for respectively receiving and retaining the balled knob and a portion of the shank of a closed eye bolt and a closed eye bolt having a radial shank of a diameter less than the width of said slot, an integral balled knob at one end thereof of larger diameter than said slot, and a closed eye at the other end, and a body member having four walls defining a passage therethrough, said passage having a taper narrowing outwardly, a tapered wedge block within said passage, said wedge block and said passage adapted to retain the looped end of a cable therebetween, said body member having two opposed walls extending beyond the wider portion of said passage, and means for receiving and retaining the closed eye of said eye bolt between said opposed walls with limited arcuate movement.

8. A coupling for a choker rope comprising in combination a choker rope, a free-running closed hook member having a transverse passage therethrough for said rope movably retaining said member thereon, said closed hook member having an opening in one side thereof connecting with an axially curved slot of narrower width for respectively receiving and retaining the balled knob and a portion of the shank of a closed eye bolt and a closed eye bolt having a radial shank of a diameter less than the width of said slot, an integral balled knob at one end thereof of larger diameter than said slot, and a closed eye at the other end, and a body member having four walls defining a passage therethrough, said passage having a taper narrowing outwardly, a tapered wedge block within said passage, said wedge block and said passage adapted to retain the looped end of a cable therebetween, said body member having two opposed walls extending beyond the wider portion of said passage, and means for receiving and retaining the closed eye of said eye bolt between said opposed walls with limited arcuate movement, said passage formed so that the longitudinal axis of said closed eye bolt is in line with the pull on the choker rope when the balled knob is retained in the axially curved slot of the closed hook member.

References Cited in the file of this patent

UNITED STATES PATENTS

| | | |
|---|---|---|
| 534,165 | Lee | Feb. 12, 1895 |
| 1,071,868 | Blackburn | Sept. 2, 1913 |
| 1,643,361 | Ashdown | Sept. 27, 1927 |
| 1,651,081 | Bardon | Nov. 29, 1927 |
| 2,743,894 | Ostnas | May 1, 1956 |
| 2,827,680 | Gibson | Mar. 25, 1958 |
| 2,946,619 | Wahl | July 26, 1960 |